(No Model.)
J. T. BRAYTON.
GAGE FOR DETERMINING THE RADIUS OF CURVATURES.
No. 447,276. Patented Feb. 24, 1891.
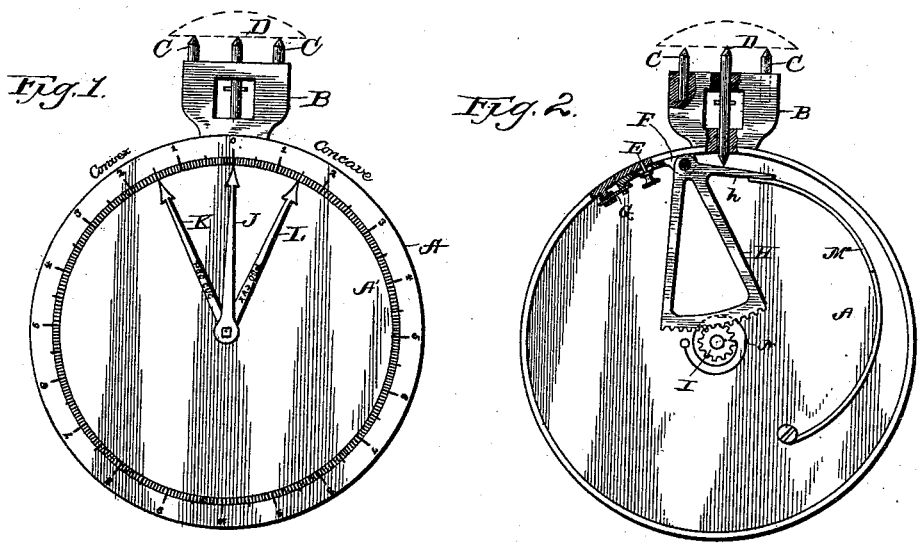
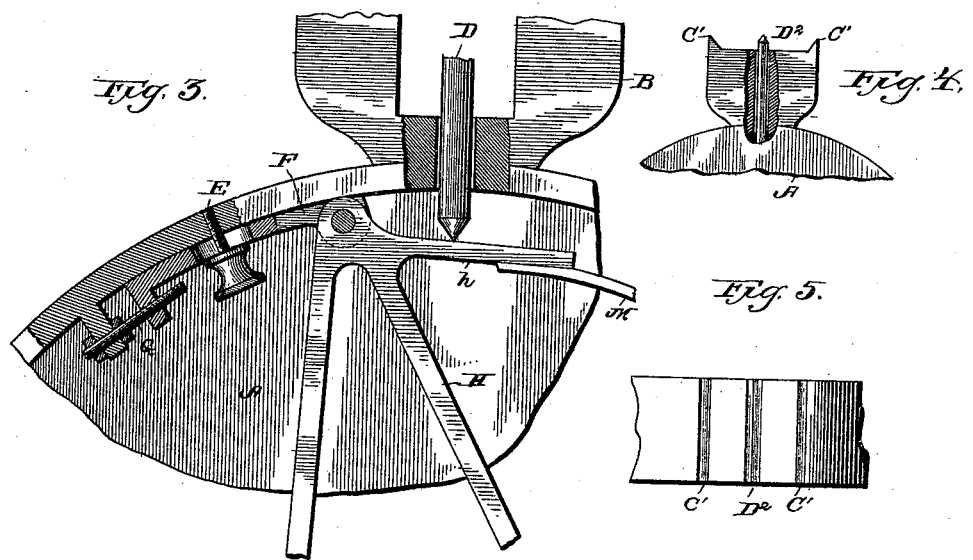

UNITED STATES PATENT OFFICE.

JAMES T. BRAYTON, OF CHICAGO, ILLINOIS, ASSIGNOR TO THE GENEVA OPTICAL COMPANY, OF ILLINOIS.

GAGE FOR DETERMINING THE RADIUS OF CURVATURE.

SPECIFICATION forming part of Letters Patent No. 447,276, dated February 24, 1891.

Application filed January 23, 1890. Serial No. 337,852. (No model.)

*To all whom it may concern:*

Be it known that I, JAMES T. BRAYTON, of Chicago, in the county of Cook, in the State of Illinois, have invented certain new and useful Improvements in Lens-Measuring Instruments, of which the following is a specification.

The object of my invention is to ascertain by direct reading the focal length of a lens, either spherical or cylindrical, basing the measurement on the curvature of the lens and taking into account, by the adjustment of the instrument, the varying refractive powers of the material of which the lens may be composed.

In the accompanying drawings I have shown, therefore, an instrument having a scale adapted to show by direct reading the focal length of a lens which is applied to the device.

In the said drawings, Figure 1 is an elevation showing the dial of the instrument. Fig. 2 is a section, the dial being removed to show the interior. Fig. 3 is a view on an enlarged scale of the adjusting device hereinafter fully described. Figs. 4 and 5 show a modification of the contact devices specially adapted to measuring cylindrical objects.

A, Figs. 1 and 2, is a casing having at one portion of its circumference a boss B. In said boss three holes are drilled, the middle one extending to the interior of the casing, and the two outer ones being tapped or threaded for the reception of studs C C. In the middle hole a pin D is fitted accurately, but loosely enough to permit its free movement. The outer ends of the studs or pins C C D are pointed and all lie in the plane passing through the axis of the pin D.

Secured to the interior of the case A by screw E is a bearing F, Fig. 2, said bearing being adjustable by means of the screw G in the manner shown. A sector H is pivoted to said bearing and meshes with the pinion I, and the latter is connected to a pointer or pointers J K L, Fig. 1. The sector H is provided with a lever-arm *h*, against which the inner end of pin D strikes, and a spring M beneath said finger tends to force the sector H to the limit of its movement and the pin D outward. A hair-spring N is connected to the pinion I, so as to take up all backlash between the sector H and the pinion.

The dial A' of the instrument may be graduated in any manner desired, but as shown in Fig. 1 indicates the power of the lens in dioptres. For example, if a plane surface be placed against the contact-points C C D, the pointer J will stand at zero. If a convex lens be substituted whose focal length is one dioptre, the pointer J will be moved to the graduation 1 at the left of the zero-mark, while a concave lens of the same curve will cause the pointer to stand at 1 on the right of zero. In order to secure the proper ratio between the movements of the pointer and of the movable contact-point D, the adjustment of the bearing F by means of the screw G is provided. If the screw E be loosened, the bearing F may be shifted by the screw G, so as to bring the pivotal point of the sector nearer to or farther from the inner end of the pin D, thus altering the ratio of movement between the pointer and the pin D.

By testing the instrument with lenses of known curvature the accuracy of the adjustment can be ascertained. As lenses of the same curvature may have foci of different lengths, owing to the difference in the refractive power of the material of which they are composed, the adjustment just described may be changed to suit lenses of different material, so that the pointer will correctly indicate the focal length of the lens, whatever may be its composition. To further adjust the instrument, so that it shall stand at zero when a plane surface or a straight-edge is in contact with the points C C D, the studs C C can be screwed in or out until they stand in the proper relation to the pin D. Where neither side of the lens is plane, it is necessary to ascertain the curve of both faces and to combine the readings in order to know the focal length of the lens; but in many cases—as, for instance, with periscopic spectacle-lenses—a standard curvature is adopted for one side of the lens, and to enable the focal length of such lenses to be ascertained by direct reading I provide the additional pointers K L. The usual fixed curvature of a periscopic lens is one and one-half dioptres, and I have therefore shown the pointers K and L placed one and one-half dioptres on each side distant from the pointer J. The pointer K will give the power of periscopic concave lens directly, while the pointer L will give the power of a periscopic convex lens in like manner.

It is necessary, in order to measure concave surfaces, to employ contact-points such as have heretofore been described; but for measuring plane or convex surfaces, especially cylindrical surfaces, accurate results may be obtained with much greater ease by substituting for contact-points parallel edges, as shown in Figs. 4 and 5. In said figures the edges C', C', and D² are substituted for the points C C D of Figs. 1 to 3. It is obvious that if a cylinder be placed so that its axis is perpendicular to the edges C' C' its curvature will not be indicated, but the reading of the scale will show that it is simply a straight line; but by turning the cylinder until its axis becomes parallel with the edges C' C' the sides of the cylinder will make contact with the edges C' C' throughout their length, and the cylinder will be in a proper position for ascertaining its outer curvature. It is also clear that in measuring a spherical surface to ascertain its correct curvature by the use of contact-points requires that the lens should be very carefully placed thereon, as a change in its position will cause a change of the reading; but when parallel edges are substituted for the points little or no care is required in placing the lens in order to get a correct reading.

It is to be understood that although the center piece D is shown as movable and the outer pieces C C fixed, and such an arrangement is preferable on account of its simplicity, yet the device would operate essentially as before if the outer pieces should be made movable and the indicating devices attached thereto, it being only essential that the relative positions of the center and outer pieces be changeable and that such changes be shown by the indicating devices. It is further to be understood that more than three contact-pieces might be employed; but three only are essential.

By using a spring for projecting the movable contact-piece, as shown in Figs. 1 and 2, I am enabled to use the instrument in any position, the range of its usefulness being thereby much increased, as it can be used upon surfaces of objects which by reason of their size or from other causes cannot easily be moved.

What I claim, and desire to secure by Letters Patent, is—

1. The combination, in a lens-measuring instrument, of contact devices consisting of three contact-pieces whose pointed ends lie in the same plane, the position of the middle contact-piece being variable relatively to the outer pieces, and indicating devices operated by the movable contact-piece, said indicating devices consisting of a lever-arm abutting against or attached to said movable contact-piece, and gearing connecting said arm to a pointer moving over a dial, said dial being graduated to show the focal length of the lens, substantially as described.

2. The combination, in a lens-measuring instrument, of contact devices consisting of three contact-pieces whose pointed ends lie in the same plane, the position of the middle contact-piece being variable relatively to the outer contact-pieces, and indicating devices operated by said movable contact-piece, said indicating devices consisting of a lever-arm abutting against or attached to said movable contact-piece and having a fulcrum movable relatively thereto, and gearing connecting said lever-arm to a pointer moving over a dial graduated to show the focal length of the lens, substantially as described.

3. The combination of the fixed contact-pieces C C, the movable contact-piece D, all three of said contact-pieces lying in the same plane, the sector H, against a projection of which the said movable piece abuts, said sector having a fulcrum movable relatively to the contact-piece D, the spring M, the pinion I, carrying the pointer J, and the dial A', graduated to show the focal length of the lens placed against said contact-pieces, substantially as described.

4. The combination, in a lens-measuring instrument, of three contact-pieces, one of said pieces being movable relatively to the other two, a pointer for indicating the movements of the movable piece, a pinion on the pointer-shaft and sector in contact with the movable piece, connecting the pointer and said movable piece, and an adjustable bearing in which said sector is pivoted, whereby the relative movement of the movable piece and the pointer may be varied, as and for the purpose described.

JAMES T. BRAYTON.

Witnesses:
IRWIN VEEDER,
P. H. T. MASON.